(12) United States Patent
Chen

(10) Patent No.: US 11,257,448 B2
(45) Date of Patent: Feb. 22, 2022

(54) LIQUID CRYSTAL DISPLAY DEVICE AND CONTROL METHOD THEREOF

(71) Applicant: Shenzhen China Star Optoelectronics Semiconductor Display Technology Co., Ltd., Shenzhen (CN)

(72) Inventor: Jiangchuan Chen, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 186 days.

(21) Appl. No.: 16/627,788

(22) PCT Filed: Dec. 24, 2019

(86) PCT No.: PCT/CN2019/127812
§ 371 (c)(1),
(2) Date: Dec. 31, 2019

(87) PCT Pub. No.: WO2021/109285
PCT Pub. Date: Jun. 10, 2021

(65) Prior Publication Data
US 2021/0327373 A1    Oct. 21, 2021

(30) Foreign Application Priority Data
Dec. 6, 2019  (CN) .......................... 201911238571.8

(51) Int. Cl.
G09G 3/36      (2006.01)
G02F 1/1335    (2006.01)
G02F 1/1347    (2006.01)

(52) U.S. Cl.
CPC ......... *G09G 3/3607* (2013.01); *G02F 1/1347* (2013.01); *G02F 1/133514* (2013.01); *G09G 2300/023* (2013.01); *G09G 2320/0242* (2013.01)

(58) Field of Classification Search
CPC .......... G09G 3/3607; G09G 2300/023; G09G 2320/0242; G02F 1/133514; G02F 1/1347
USPC .......................................................... 345/87
See application file for complete search history.

(56) References Cited

U.S. PATENT DOCUMENTS

2019/0066609 A1* 2/2019 Hirotsune ............. G06F 3/1446
2021/0124122 A1* 4/2021 Simpkins ............. G02F 1/3523

FOREIGN PATENT DOCUMENTS

CN            110111749     *  8/2019  ........... G09G 3/3406

* cited by examiner

*Primary Examiner* — Jennifer T Nguyen

(57) ABSTRACT

The present invention provides a liquid crystal display device and a control method thereof. The liquid crystal display device includes a first liquid crystal panel and a second liquid crystal panel disposed thereon. The control method of the liquid crystal display device includes following steps of: disposing an applied pixel voltage level of a first liquid crystal panel, selecting a pixel voltage level of the first liquid crystal panel, and displaying grayscale.

10 Claims, 3 Drawing Sheets

LIQUID CRYSTAL DISPLAY DEVICE AND CONTROL METHOD THEREOF

RELATED APPLICATIONS

This application is a National Phase of PCT Patent Application No. PCT/CN2019/127812 having International filing date of Dec. 24, 2019, which claims the benefit of priority of Chinese Patent Application No. 201911238571.8 filed on Dec. 6, 2019. The contents of the above applications are all incorporated by reference as if fully set forth herein in their entirety.

FIELD AND BACKGROUND OF THE INVENTION

The present invention relates to the field of flat displays, and in particular, to a liquid crystal display device and a control method thereof.

It is known that with continuous developments of display technologies, new flat-panel displays have begun to completely replace CRT displays and become mainstream display devices on the market. However, due to cost controls of driver ICs, sub-pixel units included in pixel units provided on panels generally have a maximum grayscale of 256 bits. That is, the number of colors that can be displayed by a single pixel is about 16 million colors. This is no problem for general display applications and can fully meet the needs. However, for special applications or high-end products in displays, the number of display colors is not enough. In some display situations, it is easy to cause the loss of details of the displays. Therefore, industries research and provide a solution using 10 bits display to solve the problem, however, the corresponding drive IC costs are relatively high.

Therefore, it is necessary to develop a new type of liquid crystal display device and its control method to overcome defects in the prior art.

Technical Problem

An aspect of the present invention is to provide a liquid crystal display device and a control method thereof, which are used with a new type of display architecture, so that the number of display colors of the liquid crystal panel can be greatly improved.

Technical Solution

The technical solution used for the present invention is as follows:

A liquid crystal display device comprises a first liquid crystal panel and a second liquid crystal panel disposed thereon, wherein the first liquid crystal panel is used for adjusting an amount of light of an incident light emitted from the first liquid crystal panel to the second liquid crystal panel, and the second liquid crystal panel is used as a first numerical grayscale display; wherein the first liquid crystal panel comprises a first pixel voltage and a second pixel voltage, at the first pixel voltage, the first liquid crystal panel is provided with first brightness, and at the second pixel voltage, the first liquid crystal panel is provided with second brightness; and wherein under respective inputs of the first brightness and the second brightness of the first liquid crystal panel, all pixel units of the second liquid crystal panel realize the first numerical grayscale display; under a superimposed input of the first brightness and the second brightness, the pixel units of the second liquid crystal panel realizes a second numerical grayscale display.

Further, in different embodiments, wherein the first liquid crystal panel further comprises a third pixel voltage, at the third pixel voltage, the first liquid crystal panel is provided with a third brightness, and the second liquid crystal panel realizes the first numerical grayscale display under an input of the third brightness.

Further, in different embodiments, wherein when the second liquid crystal panel performs the first numerical grayscale display, an input brightness of the first liquid crystal panel is limited to the first brightness. That is, when a low-grayscale picture displayed on the second liquid crystal panel is repeated, considering power consumption problems of the liquid crystal device in which it is disposed, in order to avoid unnecessary energy loss, it can be defined that a lowest brightness file of the first liquid crystal panel is used to perform a light input to the second liquid crystal panel, thereby realizing a display of a grayscale corresponding to the second liquid crystal panel.

Further, in different embodiments, wherein the first liquid crystal panel uses a horizontal electric field display mode, and the horizontal electric field display mode comprises in-plane switching (IPS), fringe-field switching (FFS), or a horizontal electric field display mode derived from these two display modes.

Further, in different embodiments, wherein the first liquid crystal panel comprises a first substrate, a second substrate disposed opposite to the first substrate, and a first liquid crystal layer sandwiched between the first substrate and the second substrate; wherein a first pixel structure layer is disposed on the first substrate to drive deflections of liquid crystals of the first liquid crystal layer, and the first pixel structure layer comprises first pixel units; and the second substrate is a bare glass substrate.

Further, in different embodiments, wherein the second liquid crystal panel comprises a third substrate, a fourth substrate disposed opposite to the third substrate, and a second liquid crystal layer sandwiched between the third substrate and the fourth substrate; wherein a second pixel structure layer is disposed on the third substrate to drive deflections of liquid crystals of the second liquid crystal layer, and the second pixel structure layer comprises second pixel units; wherein a color filter layer is provided with the fourth substrate, and the color filter layer comprises a red filter layer, a green filter layer, and a blue filter layer; and the second pixel units are provided with a first sub-pixel unit, a second sub-pixel unit, and a third sub-pixel unit respectively corresponding to the red filter layer, the green filter layer, and the blue filter layer Further, in different embodiments, wherein the first pixel units of the first liquid crystal panel are disposed opposite to the second pixel units of the second liquid crystal panel.

Further, in different embodiments, wherein a backlight module is disposed under the first liquid crystal panel, a first polarizer is disposed between the first liquid crystal panel and the backlight module, a second polarizer is disposed between the second liquid crystal panel and the first liquid crystal panel, and a third polarizer is disposed on an upper surface of the second liquid crystal panel.

Further, in different embodiments, wherein the second liquid crystal panel is attached to the first liquid crystal panel by a transparent adhesive. Wherein the transparent adhesive may be various transparent adhesives known in industries, and is preferably an organic resin or a siloxane, but is not limited thereto.

Further, in different embodiments, wherein a thickness of the transparent adhesive ranges from 4 um to 10 um, a thickness of a liquid crystal box of the first liquid crystal panel is 2 um to 5 um, and a thickness of a liquid crystal box of the second liquid crystal panel is 2 um to 5 um.

Further, the present invention further provides a control method of the above-mentioned liquid crystal display device, which comprises following steps of:

step for disposing an applied pixel voltage level of a first liquid crystal panel: disposing pixel voltages with different levels to the first liquid crystal panel, wherein the pixel voltages with different levels comprise a first pixel voltage and a second pixel voltage, and are divided into a first brightness and a second brightness by adjusting a transmittance level of the first liquid crystal panel;

step for selecting a pixel voltage level of the first LCD panel: selecting the pixel voltage level for the first liquid crystal panel, wherein at the first pixel voltage, the first liquid crystal panel is provided with the first brightness, and at the second pixel voltage, the first liquid crystal panel is provided with the second brightness; and step for displaying grayscale: wherein the first brightness or the second brightness of the first liquid crystal panel is used for adjusting an amount of light of an incident light emitted from the first liquid crystal panel to the second liquid crystal panel, and the second liquid crystal panel is used as a first numerical grayscale display;

wherein under respective inputs of the first brightness and the second brightness of the first liquid crystal panel, all pixel units of the second liquid crystal panel realize the first numerical grayscale display, under a superimposed input of the first brightness and the second brightness, the pixel units of the second liquid crystal panel realize a second numerical grayscale display.

Further, in the step of disposing the applied pixel voltage level of the first liquid crystal panel comprises: the pixel voltages with different levels further comprise a third pixel voltage, wherein at the third pixel voltage, the first liquid crystal panel is provided with a third brightness, and the second liquid crystal panel realizes the first numerical grayscale display under an input of the third brightness.

Beneficial Effect

Compared with the prior art, beneficial effects of the present invention are: The present invention relates to a liquid crystal display device and a control method thereof, which are used for an innovative dual-box liquid crystal display structure in which a first liquid crystal display panel and second liquid crystal display panel are stacked. Wherein the first liquid crystal panel serves as a light source to provide an amount of an incident light to the second liquid crystal panel, and the second liquid crystal panel performs normal grayscale displays.

Further, by using different driving voltages for the second liquid crystal panel, the second liquid crystal panel can be distinguished into two or more brightness files, so that the second liquid crystal panel comprises two or more input light. Regarding the amount of the incident light in different brightness files of the first liquid crystal panel, the second liquid crystal panel performs 256 bits grayscale division display. In this way, the pixel units of the second liquid crystal panel can obtain a color display in which the emitted light is divided into the 256 bits grayscale under the different brightness files. When the different brightness files are accumulated, the pixel units of the second liquid crystal panel can achieve a significant increase in the number of the grayscale that a single sub-pixel unit can display. That is, the second pixel units can display a large increase in the number of the grayscale.

Further, the first liquid crystal panel uses IPS/FFS or any horizontal electric field display modes derived therefrom. The second LCD panel uses TN/IPS/FFS/VA and any other LCD display modes derived from it. At the same time, the second pixel unit included in the second liquid crystal panel is composed of R, G, and B sub-pixels. Therefore, the color display of the display device is realized by the second liquid crystal panel. Correspondingly, the first pixel unit of the first liquid crystal panel itself can be constituted by an overall structure, and there is no need to divide and arrange three color sub-pixels of R, G, and B. It is required that an external dimension thereof corresponds to an external dimension of the second pixel unit. Therefore, it is not necessary to set a color filter for filtering operation, thereby saving the production cost of the display device in which it is disposed to a certain extent and reducing an overall thickness of the display device in which it is disposed.

Further, polarizers are attached to an upper side and a lower side of the second liquid crystal panel. The first liquid crystal panel is provided with a polarizer only on a lower side facing the backlight module, and no polarizer is provided on an upper side. Therefore, when light emitted by the backlight module first enters the lower polarizer (i.e., the first polarizer) provided on the first liquid crystal panel, it becomes linearly polarized light. Because the first liquid crystal panel uses a display mode of the horizontal electric field drive type such as IPS/FFS, in the display mode, the liquid crystal layer of the first liquid crystal panel can be regarded as a $\lambda/2$ wave plate, different rotation angles of liquid crystal molecules in the box can control the polarization angle of light emitted from the first liquid crystal panel. When the emitted light enters the second liquid crystal panel, different angles correspond to different incident light brightness due to an existence of the lower polarizing plate (i.e., the second polarizer) provided on the second liquid crystal panel. Correspondingly, the above-mentioned discrimination of different brightness files achieved by different pixel voltages is better realized.

BRIEF DESCRIPTION OF THE SEVERAL VIEWS OF THE DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DESCRIPTION OF SPECIFIC EMBODIMENTS OF THE INVENTION

The technical solution of a liquid crystal display device according to the present invention will be further described in detail below with reference to the drawings and embodiments.

Figure 1:
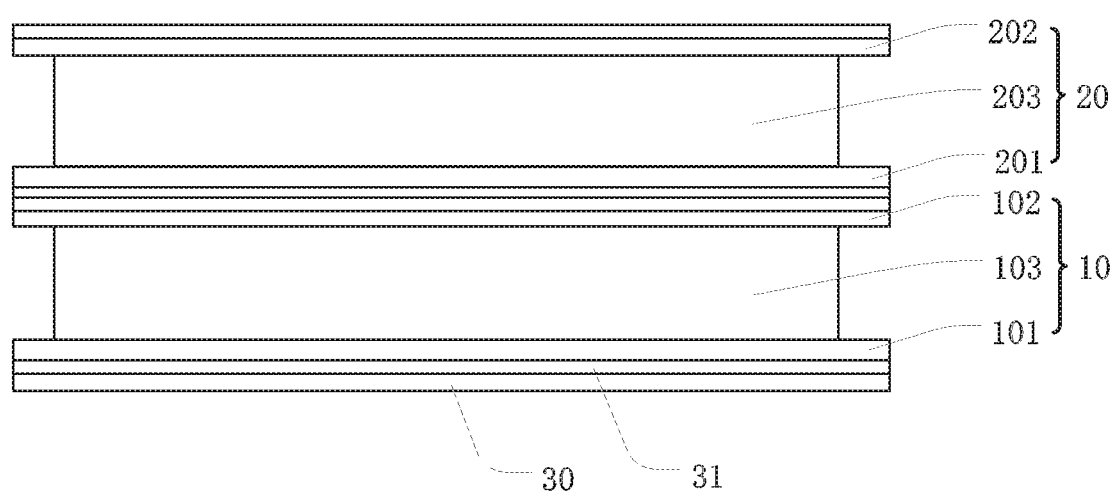
FIG. 1 is a schematic structural view of a liquid crystal display device provided in an embodiment of the present invention.

Referring to FIG. 1, an embodiment of the present invention provides a liquid crystal display device, which comprises a first liquid crystal panel 10 and a second liquid crystal panel 20 stacked thereon. That is, it is a dual-box LCD stacked display architecture.

The first liquid crystal panel 10 and the second liquid crystal panel 20 are connected by a transparent adhesive 12. A specific material used for the adhesive is preferably a transparent adhesive material such as organic resin or siloxane, but it can also be other transparent adhesive materials known in industries, and the specific material can be determined as needed, and is not limited.

Further, a specific thickness of the adhesive 12 may range from 4 um to 10 um. A thickness of a liquid crystal box of the first liquid crystal panel 10 is 2 um to 5 um, and a thickness of a liquid crystal box of the second liquid crystal panel 20 is 2 um to 5 um.

Further, a backlight module 30 is further disposed under the first liquid crystal panel 10. A first polarizer 31 is disposed between the first liquid crystal panel and the backlight module 30, that is, a lower polarizer of the first liquid crystal panel 10. An upper surface of the first liquid crystal panel 10 is not provided with an upper polarizer. A lower side and an upper side of the second liquid crystal panel are provided with polarizers, that is, the second polarizer 32 between the first liquid crystal panel 10 and the second liquid crystal panel 20, which can also be a lower polarizer 32 of the second liquid crystal panel 20, and the third polarizer 33 disposed on the second liquid crystal panel 20, which can also be an upper polarizer 33 on the second liquid crystal panel 20.

Figure 2:
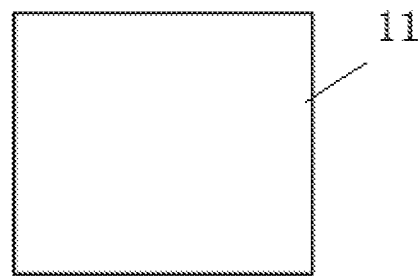
FIG. 2 is a schematic structural view of a first liquid crystal panel in the liquid crystal display device shown in FIG. 1, which comprises first pixel units.

Further, the first liquid crystal panel 10 uses an IPS/FFS or any horizontal electric field display modes derived therefrom. The first liquid crystal panel 10 comprises a first substrate 101, a second substrate 102 disposed opposite to the first substrate 101, and a liquid crystal layer 103 sandwiched between the first substrate 101 and the second substrate 102. The first substrate 101 is provided with a first pixel structure layer 111 to drive deflections of liquid crystals of the first liquid crystal layer 103. The first pixel structure layer 111 comprises first pixel units 11. The second substrate 102 is a bare glass substrate. The first pixel unit 11 is an integrated colorless sub-pixel unit. As shown in FIG. 2, it does not divide a plurality of monochrome sub-pixel units.

Further, the second liquid crystal panel 20 uses any type of LCD display modes. The second liquid crystal panel 20 comprises a third substrate 201, a fourth substrate 202 disposed opposite to the third substrate 201, and a second liquid crystal layer 203 sandwiched between the third substrate 201 and the fourth substrate 202. The third substrate 201 is provided with a second pixel structure layer 211 to drive deflections of liquid crystals of the second liquid crystal layer 203. The second pixel structure layer 211 comprises second pixel units 21. The fourth substrate 202 is provided with a color filter layer, and the color filter layer comprises a red filter layer, a green filter layer, and a blue filter layer. The second pixel units 21 are provided with a first sub-pixel unit, a second sub-pixel unit, and a third sub-pixel unit respectively corresponding to the red filter layer, the green filter layer, and the blue filter layer.

Figure 3:
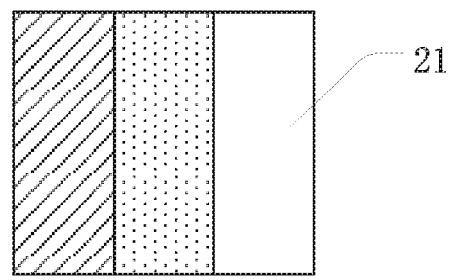
FIG. 3 is a schematic structural view of a second liquid crystal panel in the liquid crystal display device shown in FIG. 1, which comprises second pixel units.

Further, the first pixel units 11 of the first liquid crystal panel 10 and the second pixel units 21 of the second liquid crystal panel 20 are disposed opposite to each other. As shown in FIG. 3, a color display is achieved. The second pixel unit 21 and the first pixel unit 11 have the same outer dimensions. Since display colors of the display device are realized by the second liquid crystal panel 20, the first liquid crystal panel 10 does not need to be provided with a color filter to perform a filtering operation.

In use, when light emitted by the backlight module 30 enters the first polarizer 31 disposed under the first liquid crystal panel 10 and becomes linearly polarized light, because the first liquid crystal panel 10 uses a display mode of the horizontal electric field drive type such as IPS/FFS, in the display mode, the liquid crystal layer of the first liquid crystal panel 10 can be regarded as a $\lambda/2$ wave plate, different rotation angles of liquid crystal molecules in the box can control the polarization angle of light emitted from the first liquid crystal panel.

When the emitted light of the first liquid crystal panel 10 enters the second liquid crystal panel 20, due to an existence of the lower polarizer of the second liquid crystal panel 20, that is, the second polarizer 32, different angles correspond to different incident light brightnesses, so that different brightness files can be distinguished. For the different brightness files, the 256 bits grayscale of the second pixel unit of the second liquid crystal panel 20 are used for differentiating display. Then, under the different brightness files, an output light of the second pixel unit 21 can be divided into the 256 bits grayscale display, that is, emitted light of each sub-pixel unit included in it is 256 bits grayscale. After the grayscale display of the second pixel unit under the different brightness files is accumulated, the number of realistic grayscale levels of each monochrome sub-pixel included in the second pixel unit 21 can be increased.

For example, first, a brightness of the backlight module 30 is defined to be 40,000 nit, and a maximum transmittance of the light emitted from the first liquid crystal panel 10 to the second liquid crystal panel 20 is 20%. A maximum value of the transmittance is defined because it has no color resistance, and the light emitted from the first liquid crystal panel 10 is linearly polarized, and an aperture ratio is large. Therefore, the above data can be calculated by optical simulation software based on these parameter settings.

Further, by applying different pixel voltages to the first liquid crystal panel 10, the transmittance of the first liquid crystal panel 10 can be changed to three transmittance levels such as 5%, 10%, and 20%. The linearly polarized light intensities corresponding to their inputs to the second liquid crystal panel 20 are 2000 nit, 4000 nit, and 8000 nit, respectively, and are equally divided into three levels of brightness. The number of the pixel voltages of different values applied to the first liquid crystal panel 10 is not limited to three, and may be two, four, five, or even six, etc., to correspond to different transmittance levels and corresponding brightness files. The number of different pixel voltages specifically selected can be determined as needed, and is not limited.

For the second liquid crystal panel 20, the second pixel unit 21 included in the second liquid crystal panel 20 is divided into three monochrome sub-pixel units such as R/G/B. Grayscale division of each monochrome sub-pixel unit. Taking the green sub-pixel unit (G) as an example, a transmittance corresponding to 256 bits grayscale are: 0 bit grayscale/transmittance 0.00001%, 1 bit grayscale/transmittance 0.00002% to 255 bits grayscale/transmittance 5%. A relationship between the brightness file of the emitted light of the first liquid crystal panel 10 and the grayscale of the second liquid crystal panel 20 corresponding to the three brightness files is shown in FIG. 4.

Figures 4, 5:
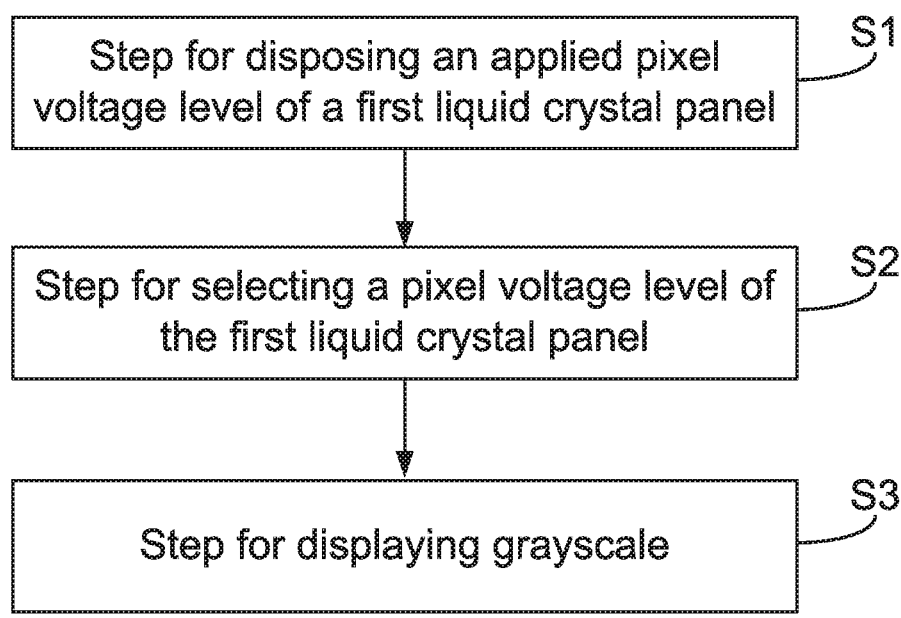
FIG. 4 is a schematic view showing a relationship between different brightness files of emitted light of the first liquid crystal panel and display grayscale of the second liquid crystal panel shown in FIG. 1.
FIG. 5 is a flowchart of a control method of the liquid crystal display device according to the embodiment of the present invention.

According to the schematic view of FIG. 4, for the second brightness file, a 127 bits grayscale brightness displayed by the second liquid crystal panel 20 is equal to 255 bits grayscale of the first brightness file, and 0 bit to 127 bits grayscale brightness of the second brightness file can be correspondingly found in the first brightness file. However, 128 bits to 256 bits grayscale in the second brightness file are higher than 255 bits grayscale in the highest brightness file of the first brightness file. Therefore, after the first and second brightness files are superimposed, each sub-pixel unit of the second pixel unit of the second liquid crystal panel 20 can distinguish the number of grayscale realized as 256+128=384, that is, 384 grayscales.

Similarly, for the third brightness file, 127 bits grayscale brightness is equal to 255 bits grayscale of the second brightness file, and the 0 to 127 bits grayscale brightness of the third brightness file can be found in the second brightness file. However, 128 bits to 256 bits grayscale of the third brightness file are higher than a maximum brightness of 255 bits grayscale of the second brightness file. Therefore, in consideration of the first, second, and third brightness files, the number of distinguishable grayscales of each monochrome sub-pixel unit of the second pixel unit 21 is 256+128+128=512 bits grayscale. That is, the number of colors that can be achieved by the entire second liquid crystal panel 20 is 512 (R)*512 (G)*512 (B)=134217728. This grayscale display value is 8 times that of conventional liquid crystal displays known in the industries, thereby greatly improving the color reproduction capability of the liquid crystal display according to the present invention.

Further, a low grayscale picture displayed by the second liquid crystal panel 20 may be repeated under different brightness files. Considering the power consumption of the liquid crystal panel, in order to avoid unnecessary energy loss, it can be defined that when there is repeated brightness, the lowest brightness file of the first liquid crystal panel 10 is displayed corresponding to the grayscale of the second liquid crystal panel 20. In other words, if the second liquid crystal panel 20 performs 256 bits grayscale display, the first liquid crystal panel 10 only needs to input its first brightness file, and no subsequent brightness file input is required, thereby saving power consumption. If the second liquid crystal panel 20 is required to perform 256 bits to 384 bits grayscale display, the first liquid crystal panel 10 only needs to perform inputs of the first and second brightness file, and the input of the third brightness is not required. Until the second liquid crystal panel 20 performs 384 bits to 512 bits grayscale display, the first liquid crystal panel 10 is required to perform the input of the third brightness file.

Based on the above principle, as shown in FIG. 5, the present invention further provides a control method of the above liquid crystal display device, which comprises following steps of:

S1, step for disposing an applied pixel voltage level of a first liquid crystal panel 10: disposing pixel voltages with different levels to the first liquid crystal panel 10, wherein the pixel voltages with different levels comprise a first pixel voltage and a second pixel voltage, and are divided into a first brightness and a second brightness by adjusting a transmittance level of the first liquid crystal panel 10;

S2, step for selecting a pixel voltage level of the first liquid crystal panel 10: selecting the pixel voltage level for the first liquid crystal panel 10, wherein at the first pixel voltage, the first liquid crystal panel 10 is provided with the first brightness, and at the second pixel voltage, the first liquid crystal panel 10 is provided with the second brightness; and S3, step for displaying grayscale: wherein the first brightness or the second brightness of the first liquid crystal panel 10 is used for adjusting an amount of light of an incident light emitted from the first liquid crystal panel 10 to the second liquid crystal panel 20, and the second liquid crystal panel 20 is used as a first numerical grayscale display;

Further, in the step S1 of disposing the applied pixel voltage level of the first liquid crystal panel 10, the pixel voltages with different levels further comprise a third pixel voltage, wherein at the third pixel voltage, the first liquid crystal panel 10 is provided with a third brightness, and the second liquid crystal panel 20 realizes the first numerical grayscale display under an input of the third brightness.

In the above, various other corresponding changes and modifications can be made according to the technical solutions and technical ideas of the present invention to those skilled in the art, and all such changes and modifications are within the scope of the claims of the present invention.

What is claimed is:

1. A liquid crystal display device, comprising:
a first liquid crystal panel comprising a plurality of first pixel units wherein the first pixel units have a first brightness at a first pixel voltage and have a second brightness at a second pixel voltage; and
a second liquid crystal panel disposed on the first liquid crystal panel and comprising:
a plurality of second pixel units disposed in one-to-one correspondence with the first pixel units and having same external dimensions as the first pixel units, wherein the second pixel units realize a first numerical grayscale display at the first brightness, realize the first numerical grayscale display at the second brightness, and realize a second numerical grayscale display under a combination of the first brightness and the second brightness; and
a color filter layer comprising a plurality of red filter layers, a plurality of green filters layer, and a plurality of blue filter layers, wherein each of the second pixel units comprises a first sub-pixel unit, a second sub-pixel unit, and a third sub-pixel unit respectively corresponding to one red filter layer, one green filter layer, and one blue filter layer.

2. The liquid crystal display device according to claim 1, wherein the first pixel units have a third brightness at a third pixel voltage, and the second pixel units realize the first numerical grayscale display at the third brightness.

3. The liquid crystal display device according to claim 1, wherein when the second pixel units realize the first numerical grayscale display, the first pixel units are limited to have the first brightness.

4. The liquid crystal display device according to claim 1, wherein the first liquid crystal panel uses a horizontal electric field display mode.

5. The liquid crystal display device according to claim 1, wherein the first liquid crystal panel further comprises:
a first substrate provided with a first pixel structure layer comprising the first pixel units;
a second substrate disposed opposite to the first substrate; and a first liquid crystal layer sandwiched between the first substrate and the second substrate and comprising a plurality of first liquid crystals, wherein the first pixel structure layer is configured to drive deflections of the first liquid crystals.

6. The liquid crystal display device according to claim 5, wherein the second liquid crystal panel further comprises:
   a third substrate provided with a second pixel structure layer comprising the second pixel units;
   a fourth substrate disposed opposite to the third substrate and provided with the color filter layer; and
   a second liquid crystal layer sandwiched between the third substrate and the fourth substrate and comprising a plurality of second liquid crystals, wherein the second pixel structure layer is configured to drive deflections of the second liquid crystals.

7. The liquid crystal display device as claimed in claim 1, further comprising a backlight module disposed under the first liquid crystal panel.

8. The liquid crystal display device according to claim 7, further comprising:
   a first polarizer disposed between the first liquid crystal panel and the backlight module;
   a second polarizer disposed between the first liquid crystal panel and the second liquid crystal panel; and
   a third polarizer disposed on a surface of the second liquid crystal panel away from the first liquid crystal panel.

9. A control method of the liquid crystal display device according to claim 1, comprising:
   setting pixel voltages of different levels applied to the first liquid crystal panel, wherein the pixel voltages comprise the first pixel voltage and the second pixel voltage;
   selecting one of the pixel voltages, wherein the first pixel units have the first brightness at the first pixel voltage and have the second brightness at the second pixel voltage; and
   displaying grayscale, wherein the second pixel units realize the first numerical grayscale display at the first brightness, realize the first numerical grayscale display at the second brightness, and realize the second numerical grayscale display under the combination of the first brightness and the second brightness.

10. The control method according to claim 9, wherein the pixel voltages further comprise a third pixel voltage, the first pixel units have a third brightness at third pixel voltage, and the second pixel units realize the first numerical grayscale display at the third brightness.

* * * * *